US011965429B1

(12) United States Patent
VanTassel

(10) Patent No.: US 11,965,429 B1
(45) Date of Patent: Apr. 23, 2024

(54) TURBOMACHINE COMPONENT WITH FILM-COOLING HOLE WITH HOOD EXTENDING FROM WALL OUTER SURFACE

(71) Applicant: GE Infrastructure Technology LLC, Greenville, SC (US)

(72) Inventor: Brad Wilson VanTassel, Greer, SC (US)

(73) Assignee: GE INFRASTRUCTURE TECHNOLOGY LLC, Greenville, SC (US)

( * ) Notice: Subject to any disclaimer, the term of this patent is extended or adjusted under 35 U.S.C. 154(b) by 0 days.

(21) Appl. No.: 18/472,405

(22) Filed: Sep. 22, 2023

(51) Int. Cl.
*F01D 5/18* (2006.01)
*F01D 9/06* (2006.01)
*F01D 25/12* (2006.01)

(52) U.S. Cl.
CPC ............. *F01D 5/186* (2013.01); *F01D 9/065* (2013.01); *F01D 25/12* (2013.01); *F05D 2220/32* (2013.01); *F05D 2240/12* (2013.01); *F05D 2240/30* (2013.01); *F05D 2260/202* (2013.01)

(58) Field of Classification Search
CPC ............................. F01D 5/186; F05D 2230/90
See application file for complete search history.

(56) References Cited

U.S. PATENT DOCUMENTS 4,738,588 A 4/1988 Field
5,771,577 A 6/1998 Gupta et al.
8,915,713 B2 12/2014 Boyer
10,895,157 B2 * 1/2021 Dudebout ............... F01D 5/288
11,306,659 B2 * 4/2022 Dudebout ................. F23R 3/06
2005/0220618 A1 10/2005 Zhang et al.
2012/0167389 A1 7/2012 Lacy et al.
2013/0078110 A1 3/2013 Boyer
2016/0061451 A1 * 3/2016 Dudebout ................. F23R 3/04 60/755
2018/0230811 A1 8/2018 Lewis et al.
2020/0224539 A1 * 7/2020 Wang ...................... F01D 5/186

FOREIGN PATENT DOCUMENTS

EP 0985802 A1 3/2000

* cited by examiner

*Primary Examiner* — Eldon T Brockman
(74) *Attorney, Agent, or Firm* — Charlotte Wilson; Hoffman Warnick, LLC

(57) ABSTRACT

A turbomachine component has a wall outer surface and an internal coolant source. A film-cooling hole is in the wall and extends from the internal coolant source to the wall outer surface. The film-cooling hole includes a metering section in fluid communication with the internal coolant source, and a diffuser section in fluid communication with the metering section and including a first internal surface spaced from a second internal surface. A coating collector receives part of a coating and is part of the diffuser section. The film-cooling hole also includes a hood section including a member extending outwardly from the wall outer surface. The member may include a hood internal surface contiguous with the first internal surface of the diffuser section and a hood outer surface parallel to the wall outer surface. The hood section reduces, and possibly prevents, the coating from filling the film-cooling hole during application thereof.

20 Claims, 10 Drawing Sheets

TURBOMACHINE COMPONENT WITH FILM-COOLING HOLE WITH HOOD EXTENDING FROM WALL OUTER SURFACE

TECHNICAL FIELD

The disclosure relates generally to component cooling. More specifically, the disclosure relates to a turbomachine component including a film-cooling hole including a hood extending from a wall outer surface of the turbomachine component.

BACKGROUND

Certain industrial components require cooling during operation. For example, a turbomachine component such as a gas turbine nozzle or blade is exposed to hot combustion gases and requires cooling, since operating temperatures may approach or exceed the melting temperature of the metal. One form of cooling includes film-cooling in which a coolant, such as air, is released through a film-cooling hole in an outer surface of a wall of the component. The coolant is directed across the outer surface, as a film, by hot combustion gases flowing along the outer surface of the component to cool the outer surface of the component.

Protective coatings, such as a ceramic thermal barrier coating, are also used on an outer surface of a turbine component to protect it from thermal damage. During manufacture of components, film-cooling holes are formed, and the coating is applied over the holes, requiring the coating to be later removed from the individual holes using, for example, hole drilling. The hole drilling process is problematic because it can damage the coating and/or the film-cooling hole, and it is time consuming and expensive.

In order to speed the hole drilling process, film-cooling holes are oftentimes configured in a linear manner, which limits the ability to place film-cooling holes where most advantageous for cooling. Various attempts have been made to form film-cooling holes that do not fill with the applied coating or to provide masks for the holes to prevent coating from entering the holes, but the challenges persist.

BRIEF DESCRIPTION

All aspects, examples and features mentioned below can be combined in any technically possible way.

An aspect of the disclosure provides a turbomachine component, comprising: a wall including a wall outer surface and an internal coolant source; and a film-cooling hole in the wall and extending from the internal coolant source to the wall outer surface, the film-cooling hole including: a metering section in fluid communication with the internal coolant source; a diffuser section in fluid communication with the metering section and including a first internal surface and including a coating collector; and a hood section including a member extending outwardly from the wall outer surface, the member including a hood internal surface contiguous with the first internal surface of the diffuser section and a hood outer surface parallel to the wall outer surface.

Another aspect of the disclosure includes any of the preceding aspects, and the coating collector includes a portion of a second internal surface of the diffuser section spaced from the first internal surface, the portion of the second internal surface having a first end intersecting the wall outer surface and forming a downstream edge of the film-cooling hole and a second end that transitions to one the metering section and another portion of the second internal surface.

Another aspect of the disclosure includes any of the preceding aspects, and the member of the hood section further includes a hood back surface connecting the hood outer surface and the wall outer surface.

Another aspect of the disclosure includes any of the preceding aspects, and further comprising a coating on the wall outer surface, on the hood back surface, and in the coating collector.

Another aspect of the disclosure includes any of the preceding aspects, and a distance between the hood outer surface and the wall outer surface is less than or equal to a thickness of the coating.

Another aspect of the disclosure includes any of the preceding aspects, and a depth of the coating collector is greater than or equal to a thickness of the coating.

Another aspect of the disclosure includes any of the preceding aspects, and the hood outer surface extends through the coating.

Another aspect of the disclosure includes any of the preceding aspects, and the hood internal surface intersects the hood outer surface forming an upstream edge of the film-cooling hole.

Another aspect of the disclosure includes any of the preceding aspects, and the metering section has a smaller cross-sectional area than the diffuser section.

Another aspect of the disclosure includes any of the preceding aspects, and the diffuser section further includes opposing side surfaces connecting the first and second internal surfaces and diverging from one another toward an outlet of the film-cooling hole.

Another aspect of the disclosure includes any of the preceding aspects, and the hood section further includes side walls coupling opposing sides of the member to the wall outer surface.

Another aspect of the disclosure includes any of the preceding aspects, and the member of the hood section extends from the wall outer surface at an obtuse angle greater than 120° and less than 180°.

Another aspect of the disclosure includes any of the preceding aspects, and the wall and the film-cooling hole are additively manufactured; and wherein the turbomachine component comprises an airfoil having the wall and the film-cooling hole.

An aspect of the disclosure includes a turbomachine component, comprising: a wall including a wall outer surface and an internal coolant source; a film-cooling hole in the wall and extending from the internal coolant source to the wall outer surface, the film-cooling hole including: (a) a metering section in fluid communication with the internal coolant source; (b) a diffuser section in fluid communication with the metering section and including a first internal surface spaced from a second internal surface and including a coating collector, the diffuser section having a larger cross-sectional area than the metering section; and (c) a hood section including a member extending outwardly from the wall outer surface, the member including a hood outer surface parallel to the wall outer surface and a hood back surface connecting the hood outer surface and the wall outer surface; and a coating on the wall outer surface, on the hood back surface, and in the coating collector, wherein the hood outer surface extends through the coating.

Another aspect of the disclosure includes any of the preceding aspects, and the coating collector includes a portion of a second internal surface of the diffuser section spaced from the first internal surface, the portion of the second internal surface having a first end intersecting the wall outer surface and forming a downstream edge of the film-cooling hole and a second end that transitions to one the metering section and another portion of the second internal surface.

Another aspect of the disclosure includes any of the preceding aspects, and the member of the hood section further includes a hood internal surface contiguous with the first internal surface of the diffuser section, and the hood internal surface intersects the hood outer surface forming an upstream edge of the film-cooling hole, and wherein the metering section intersects the coating collector at an internal edge, wherein the upstream edge is over the internal edge.

Another aspect of the disclosure includes any of the preceding aspects, and a distance between the hood outer surface and the wall outer surface less than or equal to a thickness of the coating.

Another aspect of the disclosure includes any of the preceding aspects, and a depth of the coating collector is greater than or equal to a thickness of the coating.

Another aspect of the disclosure includes any of the preceding aspects, and the hood section further includes side walls coupling opposing sides of the member to the wall outer surface.

Another aspect of the disclosure includes any of the preceding aspects, and the member of the hood section extends from the wall outer surface at an obtuse angle greater than 120° and less than 180°.

Two or more aspects described in this disclosure, including those described in this summary section, may be combined to form implementations not specifically described herein. That is, all embodiments described herein can be combined with each other.

The details of one or more implementations are set forth in the accompanying drawings and the description below. Other features, objects and advantages will be apparent from the description and drawings, and from the claims.

BRIEF DESCRIPTION OF THE DRAWINGS

These and other features of this disclosure will be more readily understood from the following detailed description of the various aspects of the disclosure taken in conjunction with the accompanying drawings that depict various embodiments of the disclosure, in which.

Figure 1:
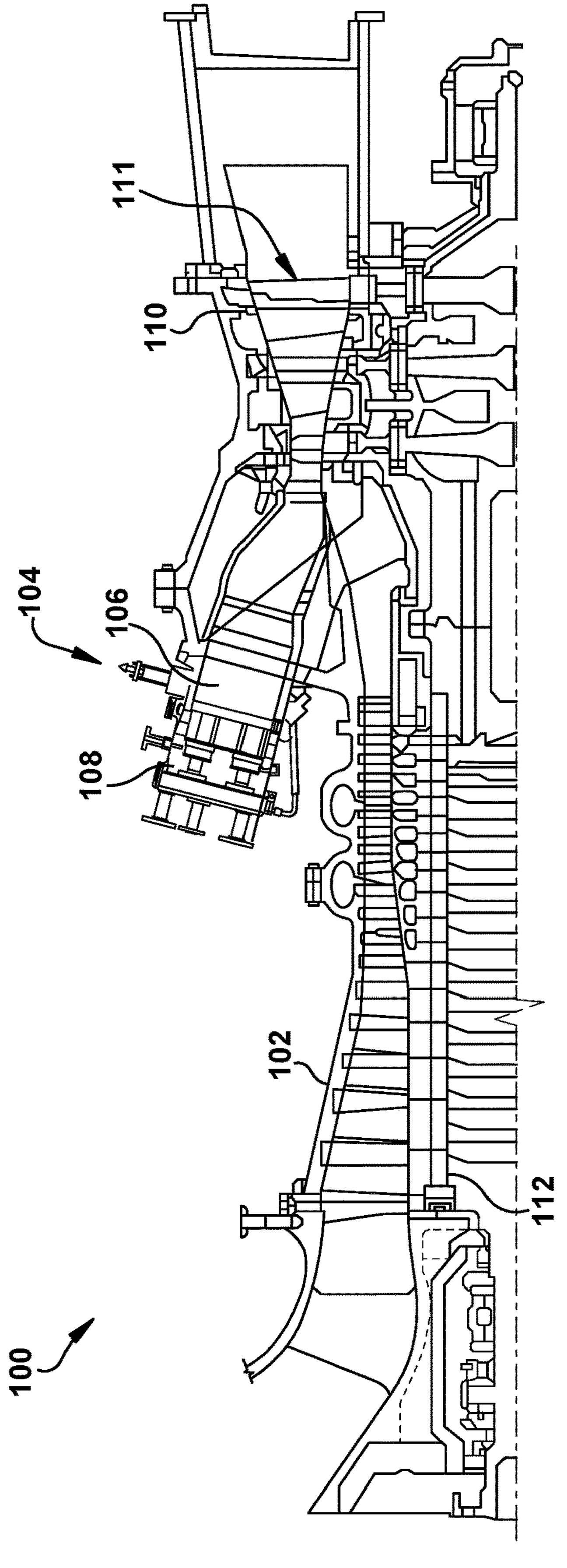
FIG. 1 (Prior Art)
FIG. 1 shows a schematic view of an illustrative industrial machine in the form of a gas turbine system.

It is noted that the drawings of the disclosure are not necessarily to scale. The drawings are intended to depict only typical aspects of the disclosure and therefore should not be considered as limiting the scope of the disclosure. In the drawings, like numbering represents like elements between the drawings.

DETAILED DESCRIPTION

As an initial matter, in order to clearly describe the current disclosure, it will become necessary to select certain terminology when referring to and describing relevant parts within the illustrative application of a component such as a turbine component. When doing this, if possible, common industry terminology will be used and employed in a manner consistent with its accepted meaning. Unless otherwise stated, such terminology should be given a broad interpretation consistent with the context of the present application and the scope of the appended claims. Those of ordinary skill in the art will appreciate that often a particular component may be referred to using several different or overlapping terms. What may be described herein as being a single part may include and be referenced in another context as consisting of multiple components. Alternatively, what may be described herein as including multiple components may be referred to elsewhere as a single part.

In addition, several descriptive terms may be used regularly herein, and it should prove helpful to define these terms at the onset of this section. These terms and their definitions, unless stated otherwise, are as follows. As used herein, "downstream" and "upstream" are terms that indicate a direction relative to the flow of a fluid, such as hot combustion gases along an outer surface of a turbine component or, for example, the flow of coolant through one of the turbomachine's components. The term "downstream" corresponds to the direction of flow of the fluid, and the term "upstream" refers to the direction opposite to the flow. The terms "forward" and "aft," without any further specificity, refer to directions, with "forward" referring to the front or compressor end of the turbomachine, and "aft" referring to the rearward or turbine end of the turbomachine.

It is often required to describe parts that are at different radial positions with regard to a center axis. The term "axial" refers to movement or position parallel to an axis, e.g., an axis of a turbomachine. The term "radial" refers to movement or position perpendicular to an axis, e.g., an axis of a turbomachine. In cases such as this, if a first component resides closer to the axis than a second component, it will be stated herein that the first component is "radially inward" or "inboard" of the second component. If, on the other hand, the first component resides further from the axis than the second component, it may be stated herein that the first component is "radially outward" or "outboard" of the second component. Finally, the term "circumferential" refers to movement or position around an axis, e.g., a circumferential interior surface of a casing extending about an axis of a turbomachine. As indicated above, it will be appreciated that such terms may be applied in relation to the axis of the turbomachine.

In addition, several descriptive terms may be used regularly herein, as described below. The terms "first," "second," and "third," may be used interchangeably to distinguish one component from another and are not intended to signify location or importance of the individual components.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. "Optional" or "optionally" means that the subsequently described event may or may not occur or that the subsequently described feature may or may not be present and that the description includes instances where the event occurs or the feature is present and instances where the event does not occur or the feature is not present.

Where an element or layer is referred to as being "on," "engaged to," "connected to," "coupled to," or "mounted to" another element or layer, it may be directly on, engaged, connected, coupled, or mounted to the other element or layer, or intervening elements or layers may be present. In contrast, when an element is referred to as being "directly on," "directly engaged to," "directly connected to," or "directly coupled to" another element or layer, there are no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items. The verb forms of "couple" and "mount" may be used interchangeably herein.

As indicated above, the disclosure provides a component, such as a turbine component, having a wall including a wall outer surface and an internal coolant source. The component also includes a film-cooling hole in the wall and extending from the internal coolant source to the wall outer surface. The film-cooling hole includes a metering section in fluid communication with the internal coolant source, and a diffuser section in fluid communication with the metering section and including a first internal surface and a coating collector. The coating collector receives part of the coating in the diffuser section. The film-cooling hole also includes a hood section including a member extending outwardly from the wall outer surface. The member may include a hood internal surface contiguous with the first internal surface of the diffuser section and a hood outer surface parallel to the wall outer surface. The coating collector allows the hood section to act as a shadow mask with a sharp edge that reduces, and possibly prevents, the coating from filling the film-cooling hole, e.g., the diffuser section and the metering section, thus reducing manufacturing time and costs, and reducing waste.

FIG. 1 shows a schematic illustration of an illustrative industrial machine, which may include a component according to teachings of the disclosure. In the example, the machine includes a turbomachine 100 in the form of a combustion or gas turbine system. Turbomachine 100 includes a compressor 102 and a combustor 104. Combustor 104 includes a combustion region 106 and a fuel nozzle assembly 108. Turbomachine 100 also includes a turbine assembly 110 and a common compressor/turbine shaft or rotor 112. In one embodiment, turbomachine 100 is a 7HA.03 engine, commercially available from General Electric Company, Greenville, S.C. The present disclosure is not limited to any one particular GT system and may be implemented in connection with other engines including, for example, the other HA, F, B, LM, GT, TM and E-class engine models of General Electric Company, and engine models of other companies. Furthermore, the present disclosure is not limited to any particular turbomachine and may be applicable to, for example, steam turbines, jet engines, compressors, turbofans, etc. Moreover, the present disclosure is not limited to any particular turbomachine and may be applicable to any industrial component that requires film cooling.

In operation, air flows through compressor 102 and compressed air is supplied to combustor 104. Specifically, the compressed air is supplied to fuel nozzle assembly 108 that is integral to combustor 104. Assembly 108 is in flow communication with combustion region 106. Fuel nozzle assembly 108 is also in flow communication with a fuel source (not shown in FIG. 1) and channels fuel and air to combustion region 106. Combustor 104 ignites and combusts fuel. Combustor 104 is in flow communication with turbine assembly 110 in which gas stream thermal energy is converted to mechanical rotational energy. Turbine assembly 110 includes a turbine 111 (i.e., an expansion turbine) that rotatably couples to and drives rotor 112. Compressor 102 also is rotatably coupled to rotor 112. In the illustrative embodiment, there is a plurality of combustors and fuel nozzle assemblies 108.

Figure 2:
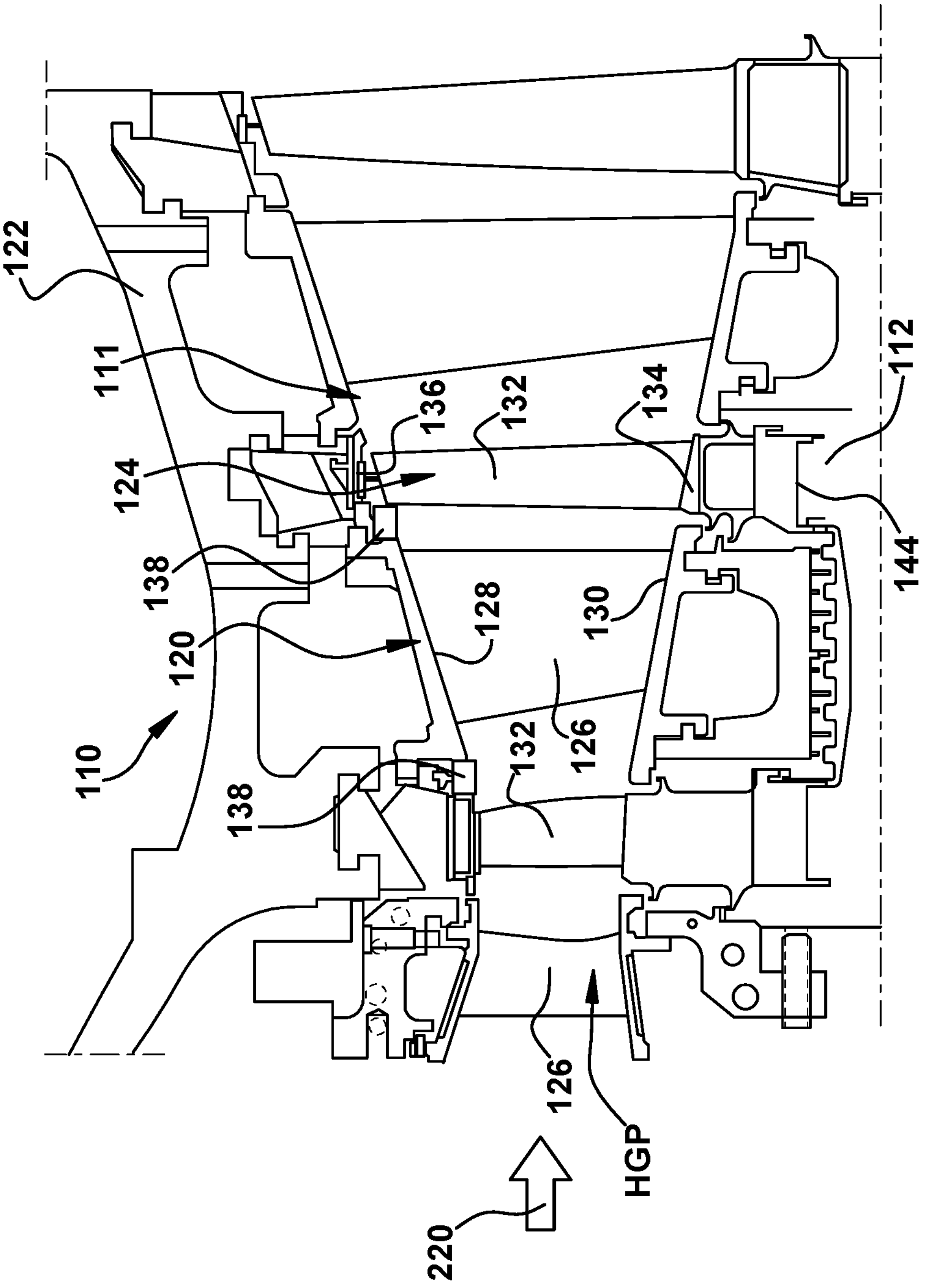
FIG. 2 (Prior Art)
FIG. 2 shows a cross-sectional view of an illustrative turbine assembly that may be used with the gas turbine system in FIG. 1.

FIG. 2 shows a cross-sectional view of an illustrative turbine assembly 110 of turbomachine 100 (FIG. 1) that may be used with the gas turbine system 100 in FIG. 1. Turbine 111 of turbine assembly 110 includes a row of nozzle or vanes 120 coupled to a stationary casing 122 of turbomachine 100 and axially adjacent a row of rotating blades 124. A stationary vane or nozzle 126 may be held in turbine assembly 110 by a radially outer platform 128 and a radially inner platform 130. Row of blades 124 in turbine assembly 110 include rotating blades 132 coupled to rotor 112 and rotating with the rotor. Rotating blades 132 may include a radially inward platform 134 (at root of blade) coupled to rotor 112 and, optionally, a radially outward tip shroud 136 (at tip of blade). A circumferential turbine shroud 138, which may be made of a plurality of shroud segments, and which may further define the hot gas path through turbine 111, may be positioned axially between rotating blades 132 and stationary nozzles 126. As used herein, the term "hot gas path component" or "component" may refer collectively to stationary nozzles 126 and rotating blades 132, unless otherwise stated.

Figure 3:
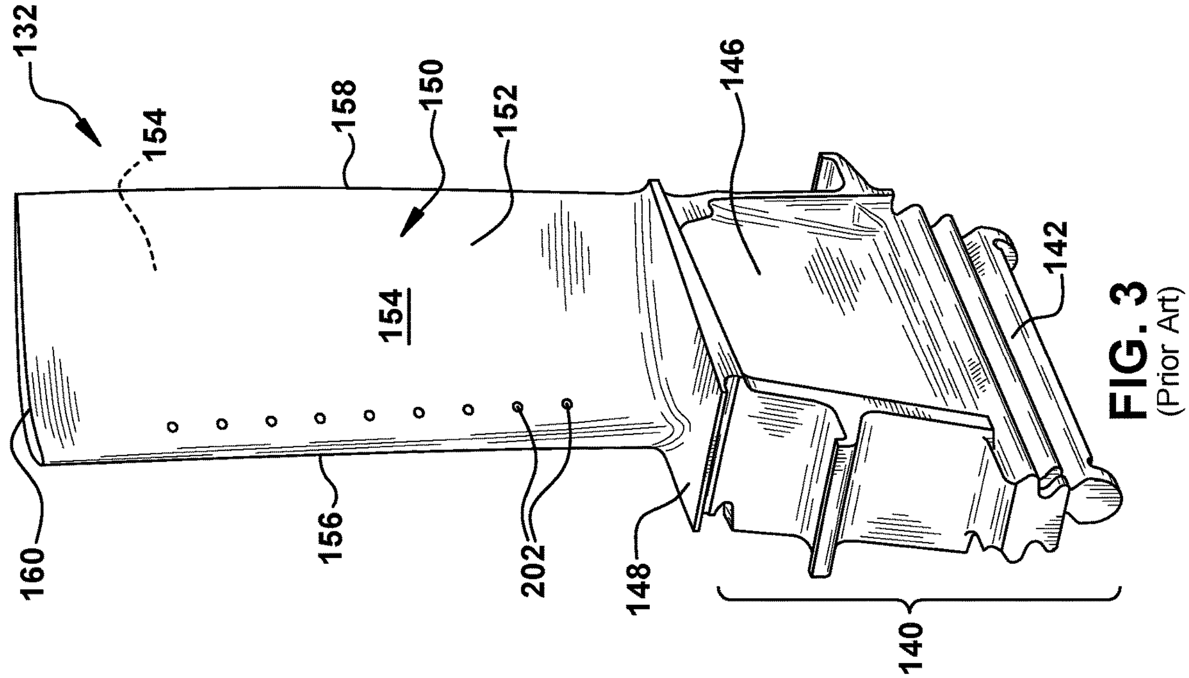
FIG. 3 (Prior Art)
FIG. 3 shows a perspective view of an illustrative component in the form of a turbine rotating blade in which embodiments of the disclosure may be employed.
Figure 4:
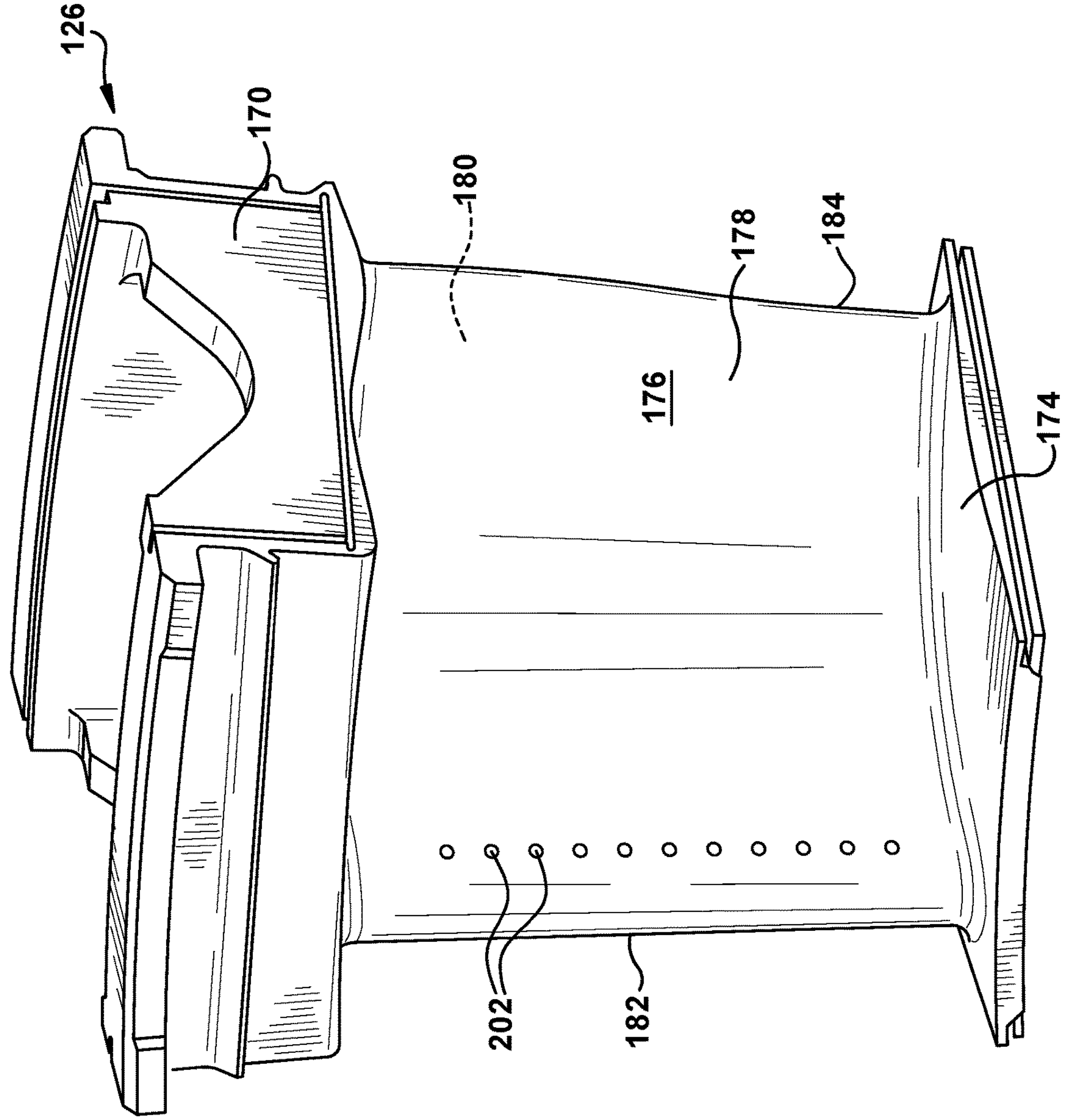
FIG. 4 shows a perspective view of an illustrative component in the form of a turbine nozzle of the type in which embodiments of the disclosure may be employed.

FIGS. 3 and 4 show illustrative components, such as hot gas path components of a turbomachine, in which teachings of the disclosure may be employed. FIG. 3 shows a perspective view of a turbine rotor blade 132 of the type in which embodiments of the present disclosure may be employed. Turbine rotor blade 132 includes a root 140 by which rotor blade 132 attaches to rotor 112 (FIG. 2). Root 140 may include a dovetail 142 configured for mounting in a corresponding dovetail slot in the perimeter of a rotor wheel 144 (FIG. 2) of rotor 112 (FIG. 2). Root 140 may further include a shank 146 that extends between dovetail 142 and a platform 148, which is disposed at the junction of airfoil 150 and root 140 and defines a portion of the inboard boundary of the hot gas flow path through turbine assembly 110. It will be appreciated that airfoil 150 is the active component of rotor blade 132 that intercepts the flow of working fluid 220 (FIG. 2), i.e., hot combustions gases, and induces the rotor disc to rotate.

It will be seen that airfoil 150 of rotor blade 132 includes a concave pressure side (PS) outer wall 152 and a circumferentially or laterally opposite convex suction side (SS) outer wall 154 extending axially between opposite leading and trailing edges 156, 158 respectively. Side walls 152 and 154 also extend in the radial direction from platform 148 to an outboard tip 160, the latter of which may or may not include a tip shroud 136 (FIG. 2).

FIG. 4 shows a perspective view of a stationary nozzle 126 of the type in which embodiments of the present disclosure may be employed. Stationary nozzle 126 includes an outer platform 170 by which stationary nozzle 126 attaches to stationary casing 122 (FIG. 2) of the turbomachine. Outer platform 170 may include any now known or later developed mounting configuration for mounting in a corresponding mount in the casing. Stationary nozzle 126 may further include an inner platform 174 for positioning between platforms 148 (FIG. 3) of adjacent turbine rotor blades 132 (FIG. 3). Platforms 170, 174 define respective portions of the outboard and inboard boundary of the flow path through turbine assembly 110. It will be appreciated that airfoil 176 is the active component of stationary nozzle 126 that intercepts the flow of working fluid and directs it towards turbine rotor blades 132 (FIG. 3). It will be seen that airfoil 176 of stationary nozzle 126 includes a concave pressure side (PS) outer wall 178 and a circumferentially or laterally opposite convex suction side (SS) outer wall 180 extending axially between opposite leading and trailing edges 182, 184 respectively. Side walls 178 and 180 also extend in the radial direction from platform 170 to platform 174.

Embodiments of the disclosure described herein may include aspects applicable to either turbine rotor blade 132 and/or stationary nozzle 126. It is understood that blade 132 or nozzle 126 may include internal cooling structures including sources of coolant such as passages, conduits and other structure(s) that deliver coolant to a surface thereof for film cooling. Coolant may include, for example, air from compressor 102.

Figure 5:
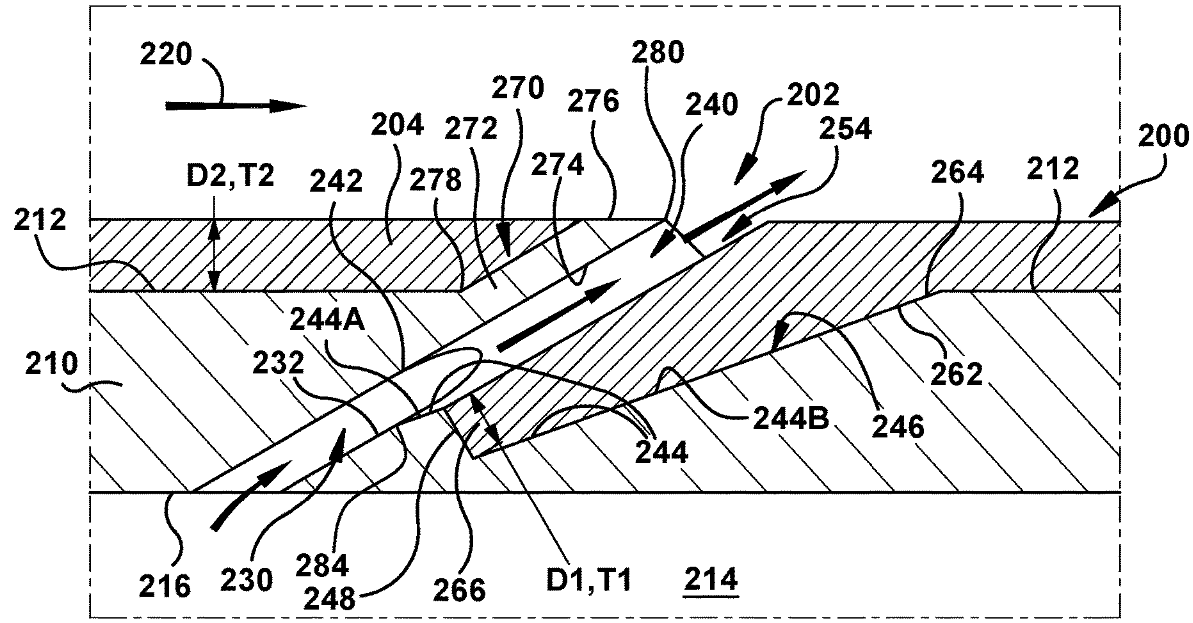
FIG. 5 shows a cross-sectional view of a component including a film-cooling hole with a coating thereon according to embodiments of the disclosure.
Figure 6:
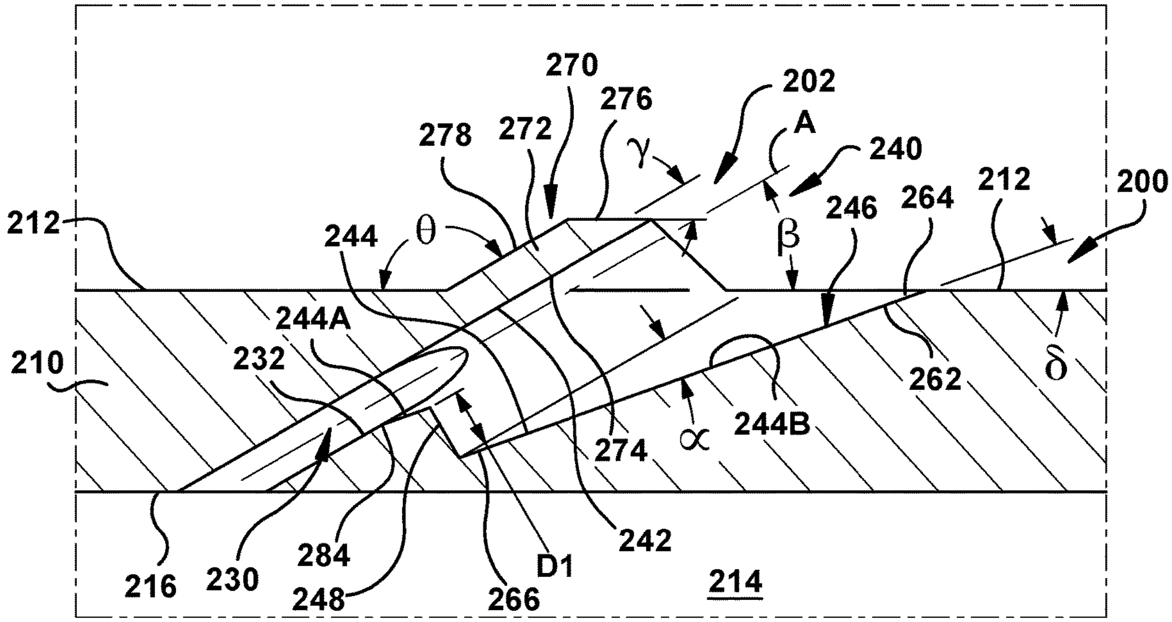
FIG. 6 shows a cross-sectional view of the component of FIG. 5 including a film-cooling hole without a coating thereon according to embodiments of the disclosure.

FIGS. 5 and 6 show cross-sectional views of a component 200 including a film cooling hole 202 according to embodiments of the disclosure. FIG. 5 shows a cross-sectional view of component 200 including a coating 204 on film cooling hole 202, and FIG. 6 shows a cross-sectional view of component 200 and film-cooling hole 202 without a coating. Component 200 may include any industrial component for which film cooling is desired. For example, component 200 may include a nozzle 126 or a blade 132 as previously described—see film cooling holes 202 in FIGS. 3 and 4.

Component 200 includes a wall 210 including a wall outer surface 212 and an internal coolant source 214. Wall 210 may have any thickness required for component 200 operation. Internal coolant source 214 may include any open space, conduit, passage, etc., through which a coolant can be delivered to wall 210. A wall inner surface 216 is an outer surface of coolant source 214 that delivers pressurized coolant. In the turbomachine application, the coolant may be compressed air, e.g., from compressor 102 (FIG. 1). Other coolant may also be provided. Coolant source 214 can take a variety of forms within component 200, e.g., chamber, passage, conduit and various other open spaces, defined within component 200. In the illustrative turbomachine 100 (FIG. 1) described herein, internal coolant source 214 may be a passage defined in nozzle 126 or blade 132 through which a coolant (arrows in FIG. 5) can pass. While film-cooling holes 202 are shown in airfoils 150, 176 of blade 132 and nozzle 126 in FIGS. 3 and 4, film-cooling hole 202 can be located in any location of blade 132 and nozzle 126 or any component 200 from which film-cooling would otherwise be employed, i.e., where a gas flow such as a hot combustion gas flow 220 (FIGS. 2 and 5) would direct coolant along a surface to be cooled.

Film-cooling hole 202 is in wall 210. More particularly, film cooling hole 202 is defined in wall 210 and extends from internal coolant source 214, i.e., a wall inner surface 216 thereof, to wall outer surface 212. In this manner, a coolant provided in internal coolant source 214 can pass through wall 210 to cool wall 210 and then be directed by hot combustion gas flow 220 of turbomachine 100 (FIG. 1) along wall outer surface 212, i.e., covered by coating 204, to cool wall outer surface 212.

Film-cooling hole 202 is arranged to allow formation of coating 204 thereon without requiring removal of coating 204 from each hole 202 after application of the coating. Film-cooling hole 202 includes a number of sections. A metering or feed section 230 is in fluid communication with internal coolant source 214. Metering or feed section 230 (hereafter "metering section 230") may have any cross-sectional shape, e.g., circular to form a cylindrical tube, oval, polygonal, etc. Metering section 230 has a cross-sectional area to measure or regulate coolant flow (arrows) from internal coolant source 214 in any desired manner, e.g., flow rate, volume, pressure, etc. The cross-sectional shape and area can be customized for the particular application. In FIGS. 5-6, metering section 230 is illustrated as a straight tube, but as will described herein, it can have a variety of alternative configurations—see, e.g., FIGS. 14-17.

From metering section 230, coolant flows into a diffuser section 240 in fluid communication with metering section 230. Metering section 230 has a smaller cross-sectional area than diffuser section 240. Diffuser section 240 begins spreading coolant flow inward of an outlet 254 of film-cooling hole 202. Diffuser section 240 includes a first internal surface 242 and a coating collector 246. Diffuser section 240 may also include a second internal surface 244 spaced from first internal surface 242. Portion(s) of second internal surface 244 may be used to define part of coating collector 246. Coating collector 246 includes an opening or void in which coating 204 can be received and melds smoothly with metering section 230 or a portion 244A of second internal surface 244.

In FIGS. 5 and 6, second internal surface 244 includes two portions 244A, 244B coupled by a transition portion 248. As shown in FIG. 6, first internal surface 242 and second internal surface 244 (i.e., portions 244A, 244B) diverge from one another at an angle $\alpha$ (shown relative to portion 244B only). Portion 244A is immediately adjacent metering section 230 and meets an internal surface 232 thereof at an internal edge 284. Hence, portion 244A of second internal surface 244 meets and is immediately adjacent metering section 230. Portion 244A diverges from first internal surface 242 and may be at the same angle α as portion 244B, or it can be at a different angle. Portion 244B is recessed relative to portion 244A to form coating collector 246, i.e., it is a recessed portion 244B, and also diverges from first internal surface 242. Recessed portion 244B may be recessed a distance D1 by transition portion 248 relative to portion 244A. Distance D1 represents a depth of coating collector 246 and is configured to be greater than or equal to a thickness T1 (FIG. 5) of coating 204 in coating collector 246. As illustrated, transition portion 248 has a length equivalent to distance D1. Portions 244A, 244B may be parallel to one another such that when coating 204 is provided on recessed portion 244B its surface is coplanar with portion 244A.

As noted, and as shown in FIG. 6, first internal surface 242 and second internal surface 244 (i.e., portions 244A, 244B) diverge from one another at an angle α (shown relative to portion 244B only). An axis of metering section 230 has an angle θ with wall outer surface 212. First internal surface 242 has an angle γ with wall outer surface 212, and second internal surface 244 has an angle δ with wall outer surface 212 (shown relative to portion 244B). Angles α, β, γ and δ may be selected to deliver coolant to wall outer surface 212 with coating 204 thereon having desired characteristics, such as but not limited to a desired pressure and direction. Angles α, β, γ and δ may be selected depending on various parameters such as but not limited to: coolant characteristics (e.g., fluid constituents, pressure, temperature, flow rate, etc.), wall 210 characteristics (e.g., material, thickness, etc.), and hot gas flow 220 (FIGS. 2, 5) characteristics (e.g., fluid constituents, pressure, temperature, flow rate, etc.). In non-limiting examples, angle α may be in a range of 5° to 20°, angle β may be in a range of 10° to 50°, angle γ may be in a range of 10° to 50°, and angle δ may be in a range of 5° to 50°.

Figure 7:
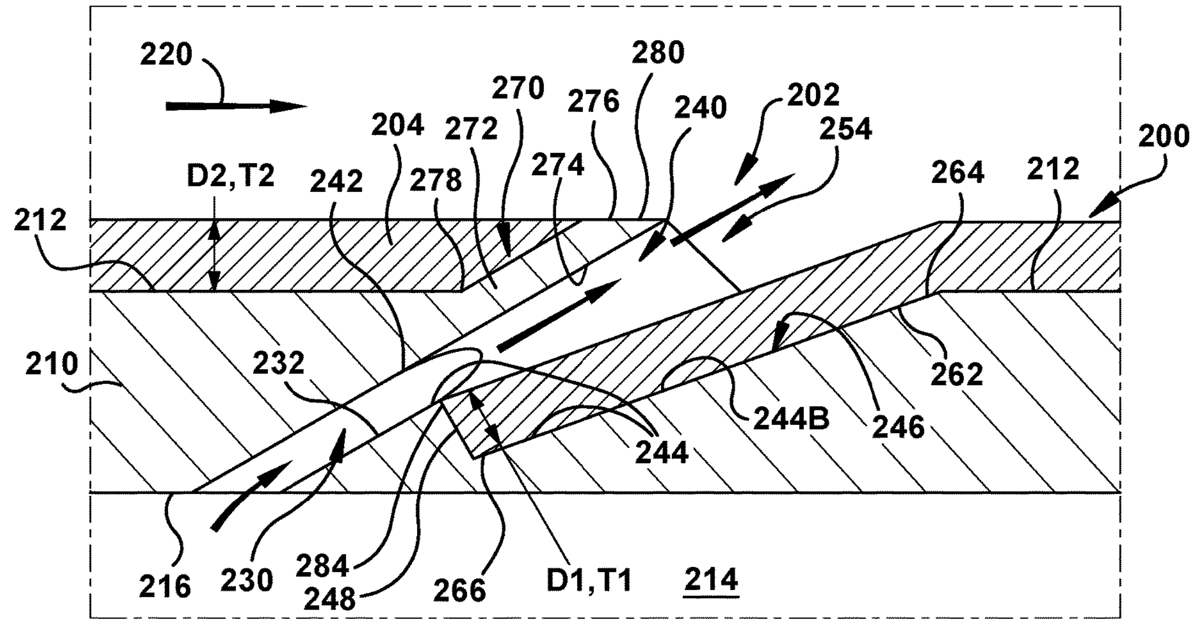
FIG. 7 shows a cross-sectional view of a component including a film-cooling hole with a coating thereon according to alternative embodiments of the disclosure.
Figure 8:
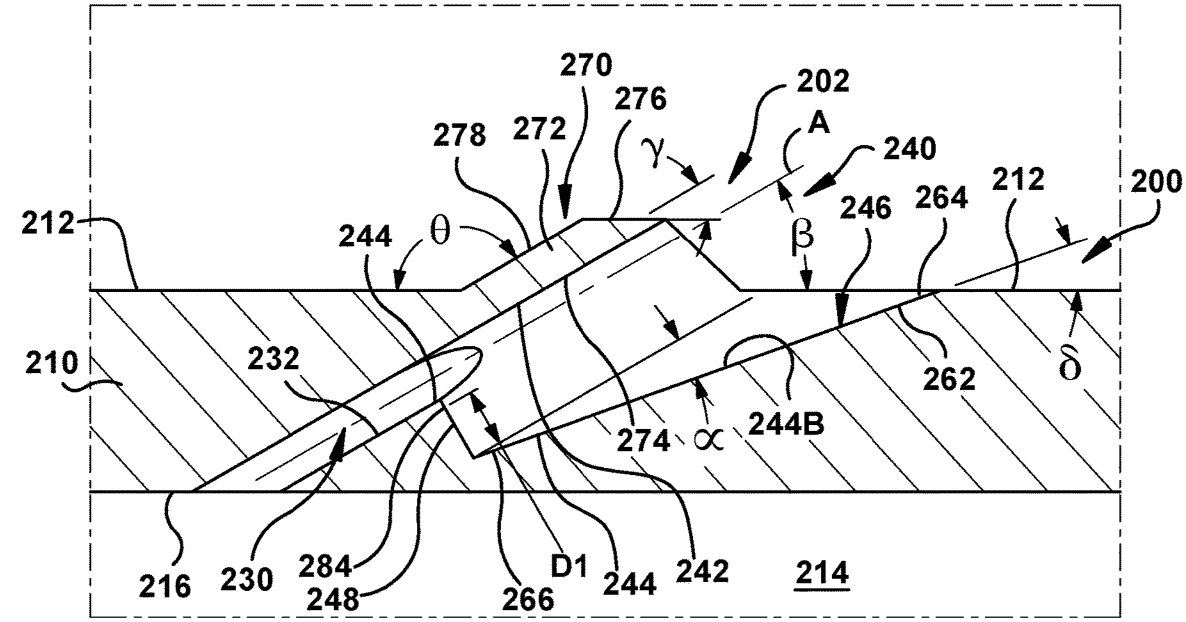
FIG. 8 shows a cross-sectional view of the component of FIG. 7 including a film-cooling hole without a coating thereon according to alternative embodiments of the disclosure.

FIGS. 7 and 8 show cross-sectional views of component 200 including film cooling hole 202 according to alternative embodiments of the disclosure. FIG. 7 shows a cross-sectional view of component 200 including coating 204 on film cooling hole 202, and FIG. 8 shows a cross-sectional view of component 200 and film-cooling hole 202 without a coating. FIGS. 7 and 8 are identical to FIGS. 5 and 6 except portion 244A of second internal surface 244 is omitted. In contrast, transition portion 248 meets internal surface 232 of metering section 230. Here, distance D1 represents a depth of coating collector 246 that is greater than or equal to thickness T1 of coating 204 in coating collector 246. Transition portion 248 and portion 244B of second internal surface 244 are otherwise as previously described.

Figure 9:
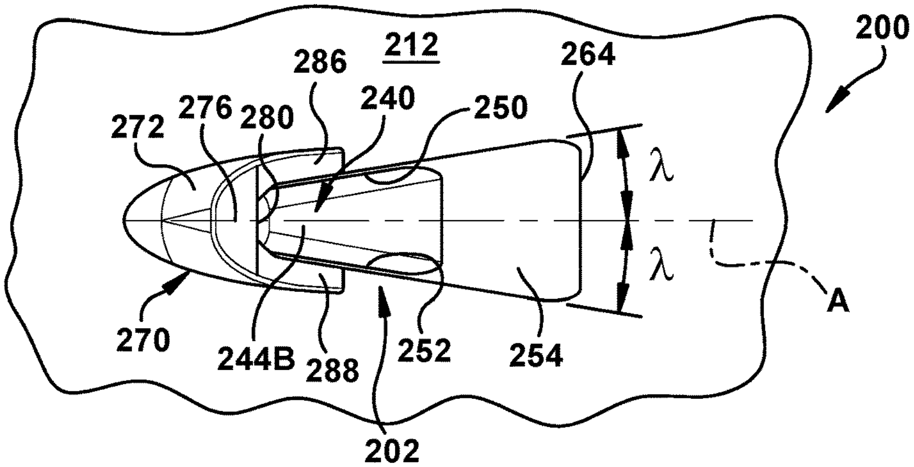
FIG. 9 shows a top-down view of a component including a film-cooling hole without a coating thereon according to embodiments of the disclosure.

FIG. 9 shows a top-down view of component 200 including film-cooling hole 202 without a coating thereon according to embodiments of the disclosure. As shown in FIG. 9, diffuser section 240 may also include opposing side surfaces 250, 252 which intersect internal surfaces 242, 244 and diverge from axis A of film cooling hole 202 toward outlet 254. Opposing side surfaces 250, 252 connect first and second internal surfaces 242, 244 and may diverge from one another toward outlet 254 of film-cooling hole 202. In this manner, lateral divergence of coolant is provided along wall outer surface 212. Each opposing side surface 250, 252 may diverge relative to metering section axis A at an angle λ in a range of, for example, 5° to 30°. In alternative embodiments, opposing side surfaces 250, 252 may also be parallel to one another (and axis A), see, e.g., FIGS. 14 and 16 (note, the side surfaces are not labeled in FIGS. 14 and 16 for clarity). In alternative embodiments (not shown), opposing side surfaces 250, 252 may be oriented at different angles relative to metering section axis A, creating a non-symmetrical channel.

Coating collector 246 may be defined by and include recessed portion 244B of second internal surface 244. Hence, recessed portion 244B forms part of diffuser section 240 and part of coating collector 246 thereof. Recessed portion 244B has a first end 262 intersecting wall outer surface 212 and forming a downstream edge 264 of film-cooling hole 202 and a second end 266 that transitions to transition portion 248. As noted, distance D1 between metering section 230 (FIGS. 7-8) or portion 244A of second internal surface 244 (FIGS. 5-6) and recessed portion 244B of coating collector 246 defines the depth of coating collector 246. Distance D1 is greater than or equal to a thickness T1 of coating 204 applied at that location, i.e., at internal edge 284, so coolant flows smoothly from metering section 230 into diffuser section 240.

Film cooling hole 202 also includes a hood section 270 including a member 272 extending outwardly from wall outer surface 212. Member 272 includes a hood internal surface 274 contiguous with first internal surface 242 of diffuser section 240 and a hood outer surface 276. Hood outer surface 276 can be parallel to wall outer surface 212. First internal surface 242 is inward of wall outer surface 212, and hood internal surface 274 is outward of wall outer surface 212, forming a contiguous surface. Although not necessary in all cases, first internal surface 242 and hood internal surface 274 can be coplanar, i.e., they are one continuous surface.

Figure 10:
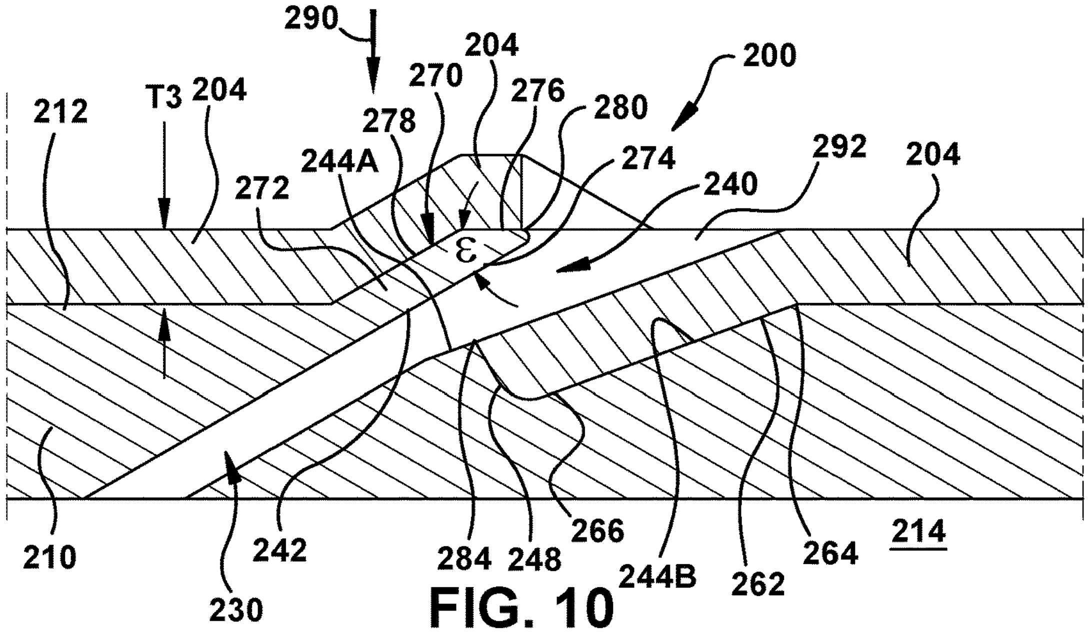
FIG. 10 shows a cross-sectional view of the component of FIG. 5 including a film-cooling hole with a coating applied thereon according to embodiments of the disclosure.
Figure 11:
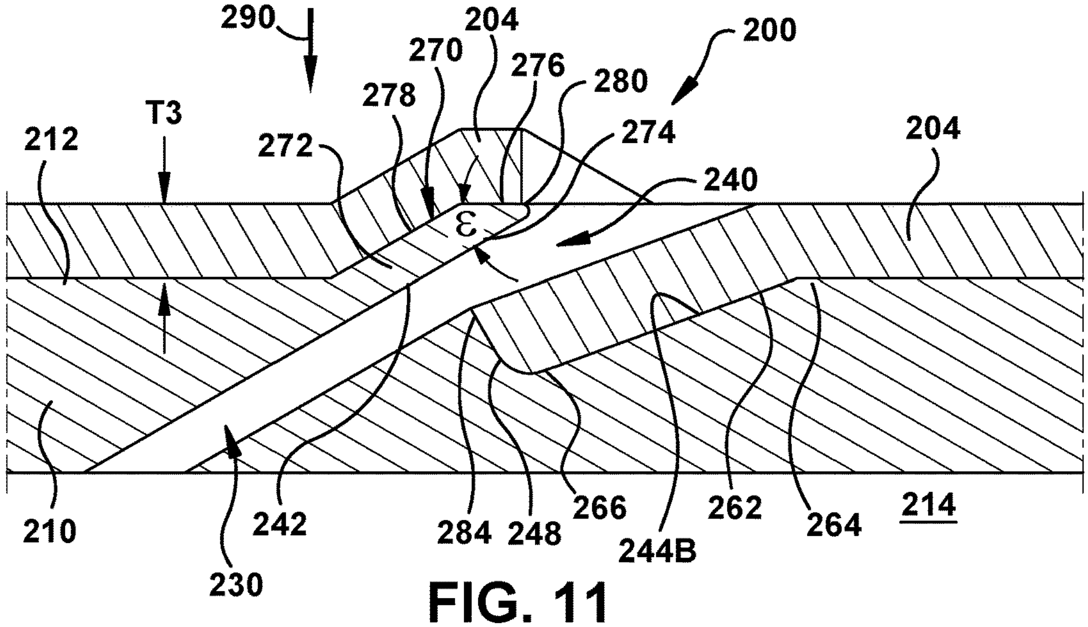
FIG. 11 shows a cross-sectional view of the component of FIG. 7 including a film-cooling hole with a coating applied thereon according to embodiments of the disclosure.

Member 272 of hood section 270 further includes a hood back surface 278 connecting hood outer surface 276 and wall outer surface 212. As shown in FIGS. 5 and 7, coating 204 is on wall outer surface 212, hood back surface 278 and in coating collector 246 (i.e., in recessed portion 244B of second internal surface 244). A distance D2 between hood outer surface 276 and wall outer surface 212 is less than or equal to a thickness T2 of coating 204 at that location. Hood internal surface 274 intersects hood outer surface 276 forming an upstream edge 280 of film-cooling hole 202. As illustrated, upstream edge 280 is relatively sharp, e.g., as shown in FIGS. 10 and 11, upstream edge 280 may have an angle ε in a range of 5° and 50°. In certain embodiments, as shown in FIGS. 5-8, 10 and 11, upstream edge 280 is over and slightly downstream of internal edge 284 defined between transition portion 248 and metering section 230 or portion 244B of second internal surface 244.

As shown in FIGS. 6 and 8, member 272 of hood section 270 extends from wall outer surface 212 at an angle θ, which is selected to adequately support coating 204 from hood section 270. In certain embodiments, angle θ can be an obtuse angle, which is greater than 120° and less than 180°. In other embodiments, angle θ can be in a range of 130° to 180°. In other embodiments, angle θ can be in a range of 140° to 170°.

Figure 12:
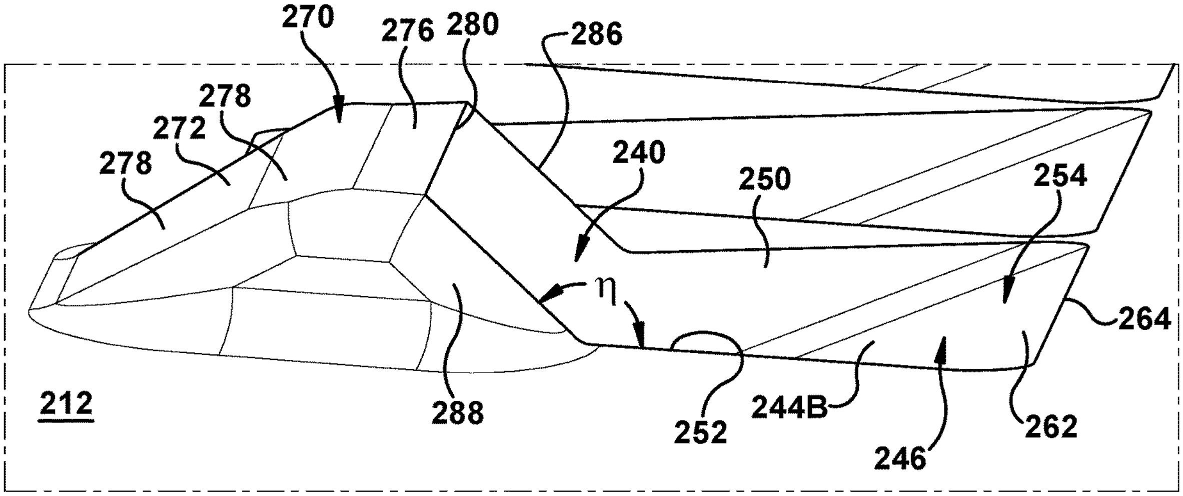
FIG. 12 shows a perspective view of a component including a film-cooling hole without a coating thereon according to embodiments of the disclosure.

FIG. 12 shows a perspective view of component 200 including film-cooling hole 202 without a coating thereon according to embodiments of the disclosure. As shown in FIGS. 9 and 12, hood section 270 may further include side walls 286, 288 coupling opposing sides of member 272 to wall outer surface 212. In this manner, hood section 270 prevents coating 204 from entering diffuser section 240 or metering section 230 from the sides thereof. As shown in FIG. 12, side surfaces 286, 288 may be at a non-perpendicular angle η relative to wall outer surface 212. In certain embodiments, angle η can be greater than 90°. In other embodiments, angle η can be in a range of 90° to 135°. Alternatively, angle η could be in a range of 135° to 180°.

FIGS. 10 and 11 show cross-sectional views of component 200 including film-cooling hole 202 immediately after application of coating 204 according to embodiments of the disclosure. FIG. 10 shows coating 204 on the FIG. 5 embodiment, and FIG. 11 shows coating 204 on the FIG. 7 embodiment. As shown in FIGS. 10 and 11, hood section 270 prevents coating 204 from filling diffuser section 240 and/or metering section 230 during coating application, eliminating the need to individually re-open film-cooling holes 202. Hood section 270 is cantilevered outwardly from wall outer surface 212 such that it only extends partially over, and only partially covers, diffuser section 240. In this manner, hood section 270 is not a full mask in that it does not fully cover and does not extend completely over diffuser section 240. Notably, hood section 270 does not need to be removed and can remain as part of component 200, reducing manufacturing time and costs, and reducing waste (e.g., of removed mask parts).

Component 200 may also include coating 204. Coating 204 may include any now known or later developed protective coating for a component 200 exposed to, for example, hot combustion gases 220 (FIGS. 2, 5 and 7). In certain embodiments, coating 204 may include any now known or later developed thermal barrier coating (TBC) such as but not limited to: a rare earth doped zirconium oxide, cobalt-nickel-chrome-aluminum-yttrium (CoNiCrAlY), yttria stabilized zirconia (YSZ), mullite ($3AL_2O_3$-$2SiO_2$), alumina ($Al_2O_3$), ceria ($CeO_2$), rare-earth zirconates (e.g., $La_2Zr_2O_7$), rare-earth oxides (e.g., $La_2O_3$, $Nb_2O_5$, $Pr_2O_3$, $CeO_2$), and metal glass composites, and combinations thereof (e.g., alumina and YSZ or ceria and YSZ). In the case of YSZ, by substituting a certain amount of zirconium ions ($Zr^{4+}$) with slightly larger yttrium ions ($Y^{3+}$), stable sintered xYSZ (x represents mol % of Yttrium ions, e.g., 8YSZ) can be obtained. Coating 204 may also include any now known or later developed bond coating, e.g., CoNiCrAlY (not separately shown).

In accordance with certain embodiments, during manufacture, wall 210 and film-cooling hole 202 may be additively manufactured. Subsequently, with reference to FIGS. 10 and 11, coating 204 may be applied using any now known or later developed coating process such as, but not limited to, plasma spraying. Coating 104 may be applied in a direction 290 intended to form a layer of thickness T3 on wall outer surface 212. As described, hood section 270 prevents coating 204 from filling diffuser section 240 and/or metering section 230, eliminating the need to individually re-open film-cooling holes 202. In accordance with desired thickness T3, coating direction 290 and angle δ (FIGS. 6 and 8) of coating collector 246, distance D1 (i.e., depth of coating collector 246 as sized by transition portion 248) is identified while also considering the known solidification conditions of the material of coating 204.

Transition portion 248 between recessed portion 244B of second internal surface 244 (i.e., coating collector 246) and either metering section 230 (FIGS. 7 and 8) or portion 244A of second internal surface 244 (FIGS. 5 and 6) may take any form desired. In the example shown in FIGS. 5-8, the contour of transition portion 248 is fairly sharp, e.g., approximately 90°, and in FIGS. 10 and 11, the contour is more gradual and curved. Generally, the contour of transition portion 248 is arranged to provide a smooth transition between coating 204 and metering section 230 (FIG. 7 or 8) or portion 244B of second internal surface 244 (FIGS. 5 and 6). The exact position of internal edge 284 may be based on, for example, the coating direction 290, coating application conditions, and coating material characteristics.

Figure 13:
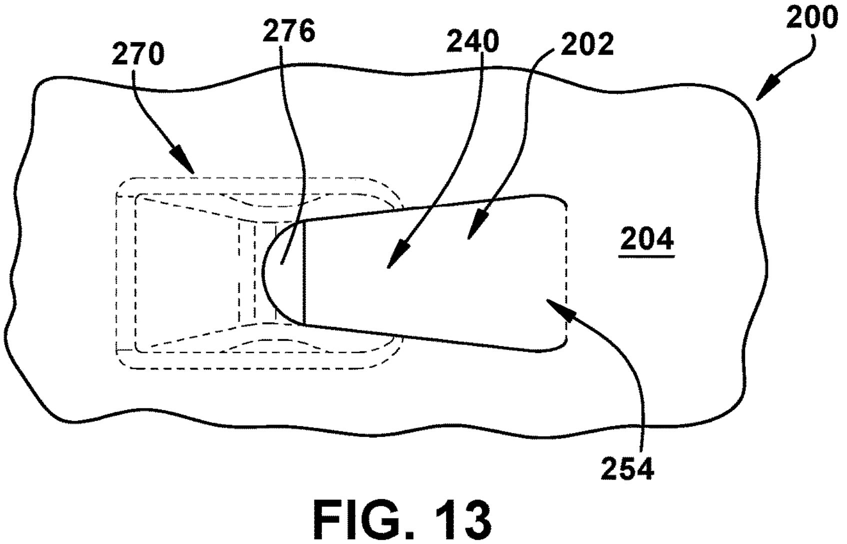
FIG. 13 shows a top-down view of a component including a film-cooling hole with a coating thereon according to embodiments of the disclosure.

FIGS. 5 and 7 and the top-down view of FIG. 13 show component 200 including film-cooling hole 202 with coating 204 after removing excess coating as shown in FIGS. 10 and 11. More particularly, a coating removal process such as an abrading or grinding process is performed to remove excess coating 204 from over hood section 270 (as shown in FIGS. 10 and 11). After this process, as shown in FIGS. 5, 7 and 13, hood outer surface 276 may extend through coating 204. That is, hood outer surface 276 may be visible through coating 204. Hood outer surface 276 can have a variety of different cross-sectional shapes as it extends through coating 204. For example, in FIG. 13, hood outer surface 276 is semicircular. In other embodiments, as shown for example in FIGS. 14-17, it may be polygonal (e.g., square, rectangular, trapezoidal, etc.) or other shapes.

In operation, coolant flow from film-cooling hole 202 is quickly deflected by diffuser section 240 in the direction of flow of hot gas 220 (FIGS. 2 and 5), so that coolant which exits outlet 254 of film-cooling hole 202 contacts with surface of coating 204. Wall outer surface 212 is covered with coating 204. Coating collector 246 is filled with coating 204 material up to internal edge 284, providing similar cooling effectiveness as if coating collector 246 was not present. However, coating 204 enables coolant to be saved and used in the hot combustion gas flow 220 (FIGS. 2, 5 and 7), which leads to an increased cooling of component 200, and, in the case of a gas turbine system, increased power output.

Figure 14:
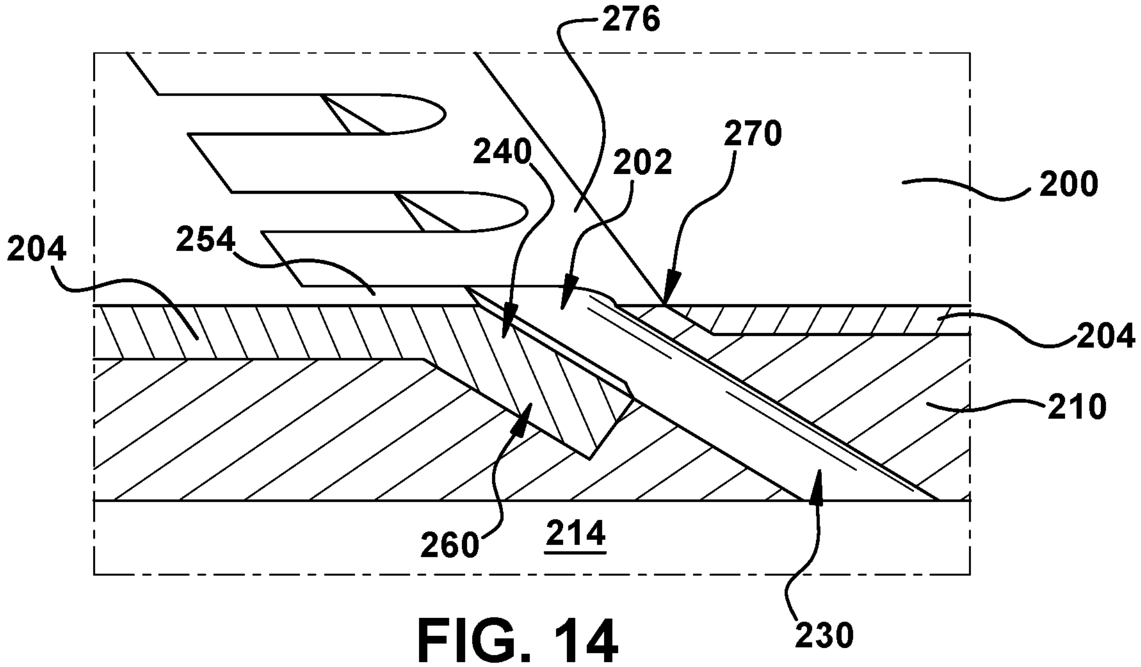
FIGS. 14-17 show cross-sectional views of components including film-cooling holes according to various alternative embodiments of the disclosure.
Figure 15:
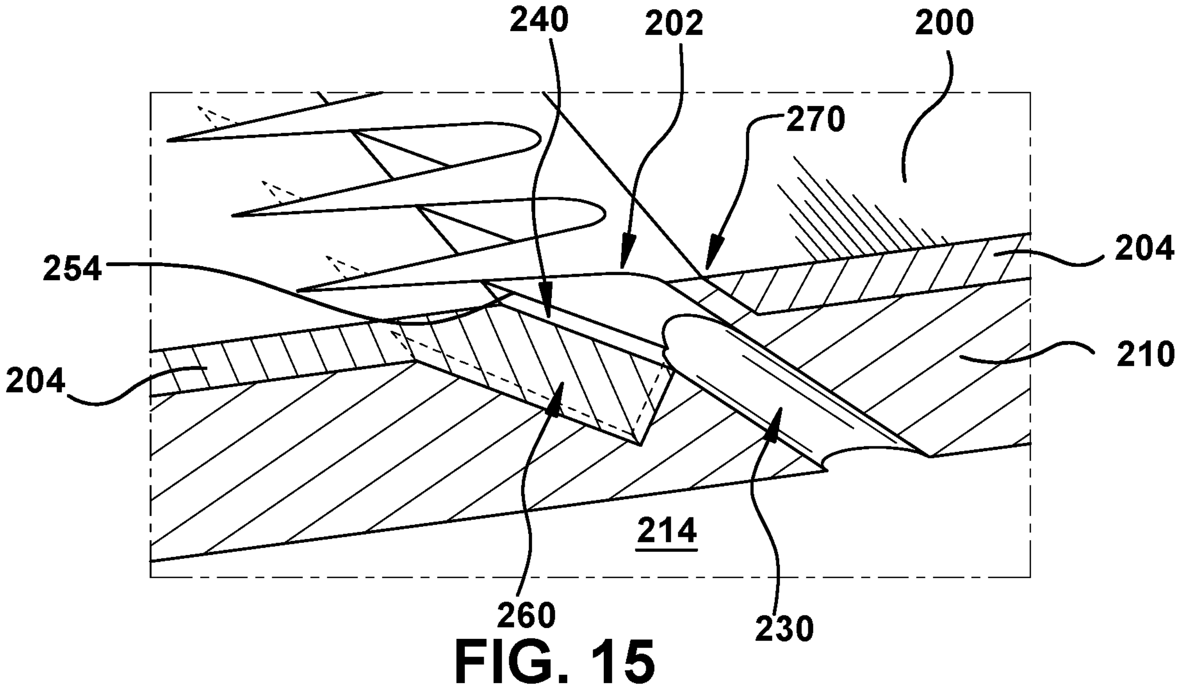
Figure 16:
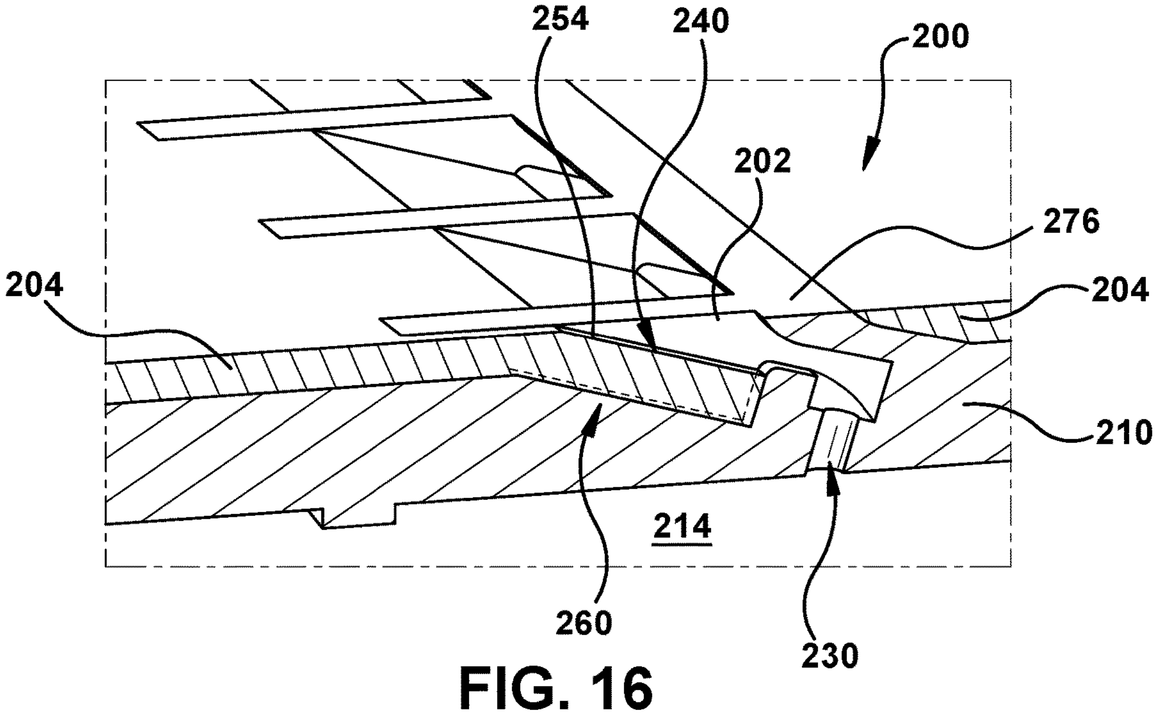
Figure 17:
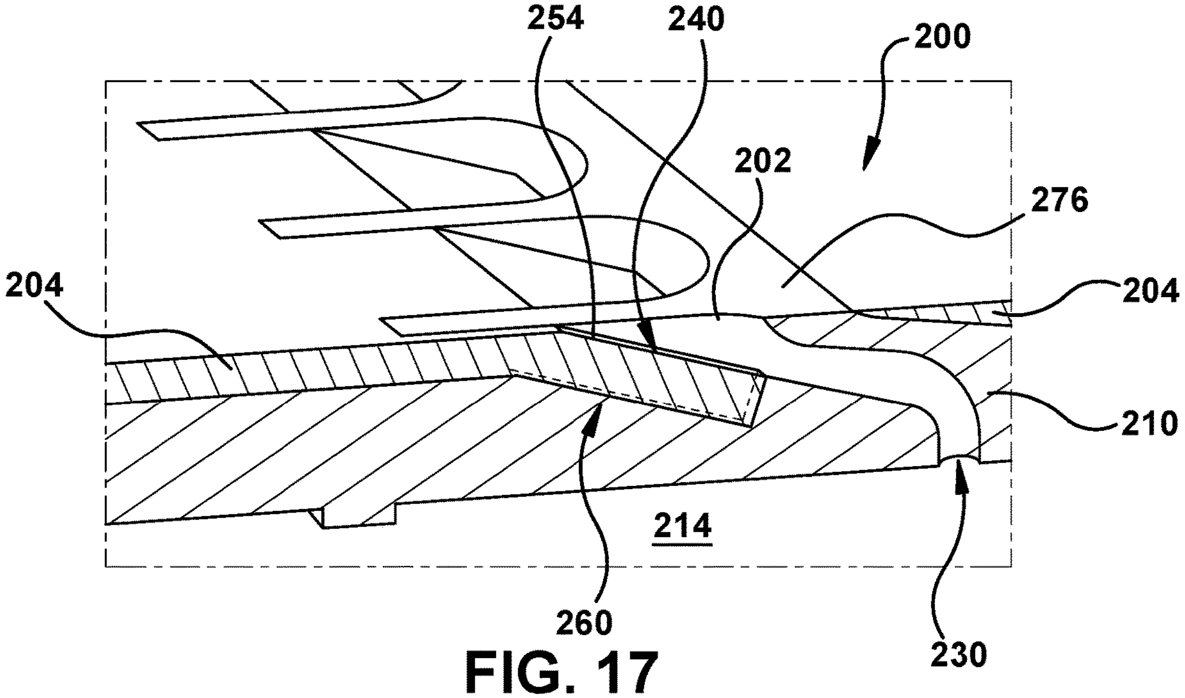

FIGS. 14-17 show cross-sectional views of components 200 including film-cooling holes 202 according to various alternative embodiments of the disclosure. FIG. 14 shows film-cooling hole 202 having a diffuser section 240 with a polygonal opening with a rounded upstream end. FIG. 15 shows film-cooling hole 202 having a diffuser section 240 with a trapezoidal opening that is elongated compared to that shown in FIGS. 5-8. FIG. 16 shows film-cooling hole 202 having a diffuser section 240 with a rectangular opening and a metering section 230 with a multi-section opening to coolant source 214. FIG. 17 shows film-cooling hole 202 having a diffuser section 240 with a curved opening with a rounded upstream end and a metering section 230 with a cross-sectionally curved opening to coolant source 214 that converges slightly toward diffuser section 240. While various alternative embodiments of film-cooling hole 202 have been illustrated, it will be recognized that various other shapes and configurations of the parts of film-cooling hole 202 can also be provided in accordance with the teachings of the disclosure.

Embodiments of the disclosure provide various technical and commercial advantages, examples of which are discussed herein. The film-cooling hole including the hood section and the coating collector allows the hood section to act as a shadow mask with a sharp edge that reduces, and possibly prevents, the coating from filling the film-cooling hole, e.g., the diffuser section and the metering section, thus reducing manufacturing time and costs and reducing waste.

Approximating language, as used herein throughout the specification and claims, may be applied to modify any quantitative representation that could permissibly vary without resulting in a change in the basic function to which it is related. Accordingly, a value modified by a term or terms, such as "about," "approximately" and "substantially," are not to be limited to the precise value specified. In at least some instances, the approximating language may correspond to the precision of an instrument for measuring the value. Here and throughout the specification and claims, range limitations may be combined and/or interchanged; such ranges are identified and include all the sub-ranges contained therein unless context or language indicates otherwise. "Approximately" or "about," as applied to a particular value of a range, applies to both end values and, unless otherwise dependent on the precision of the instrument measuring the value, may indicate +/−10% of the stated value(s).

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description but is not intended to be exhaustive or limited to the disclosure in the form disclosed. Many modifications and variations will be apparent to those of ordinary skill in the art without departing from the scope and spirit of the disclosure. The embodiments were chosen and described in order to best explain the principles of the disclosure and the practical application and to enable others of ordinary skill in the art to understand the disclosure for various embodiments with various modifications as are suited to the particular use contemplated.

What is claimed is:

1. A turbomachine component, comprising:

a wall including a wall outer surface and an internal coolant source; and a film-cooling hole in the wall and extending from the internal coolant source to the wall outer surface, the film-cooling hole including:

a metering section in fluid communication with the internal coolant source;

a diffuser section in fluid communication with the metering section and including a first internal surface and a coating collector; and a hood section including a member extending outwardly from the wall outer surface, the member including a hood internal surface contiguous with the first internal surface of the diffuser section and a hood outer surface parallel to the wall outer surface.

2. The turbomachine component of claim 1, wherein the coating collector includes a portion of a second internal surface of the diffuser section spaced from the first internal surface, the portion of the second internal surface having a first end intersecting the wall outer surface and forming a downstream edge of the film-cooling hole and a second end that transitions to one the metering section and another portion of the second internal surface.

3. The turbomachine component of claim 1, wherein the member of the hood section further includes a hood back surface connecting the hood outer surface and the wall outer surface.

4. The turbomachine component of claim 3, further comprising a coating on the wall outer surface, on the hood back surface, and in the coating collector.

5. The turbomachine component of claim 4, wherein a distance between the hood outer surface and the wall outer surface is less than or equal to a thickness of the coating.

6. The turbomachine component of claim 4, wherein a depth of the coating collector is greater than or equal to a thickness of the coating.

7. The turbomachine component of claim 4, wherein the hood outer surface extends through the coating.

8. The turbomachine component of claim 1, wherein the hood internal surface intersects the hood outer surface forming an upstream edge of the film-cooling hole.

9. The turbomachine component of claim 1, wherein the metering section has a smaller cross-sectional area than the diffuser section.

10. The turbomachine component of claim 1, wherein the diffuser section further includes opposing side surfaces connecting the first and second internal surfaces and diverging from one another toward an outlet of the film-cooling hole.

11. The turbomachine component of claim 1, wherein the hood section further includes side walls coupling opposing sides of the member to the wall outer surface.

12. The turbomachine component of claim 1, wherein the member of the hood section extends from the wall outer surface at an obtuse angle greater than 120° and less than 180°.

13. The turbomachine component of claim 1, wherein the wall and the film-cooling hole are additively manufactured; and wherein the turbomachine component comprises an airfoil having the wall and the film-cooling hole.

14. A turbomachine component, comprising:

a wall including a wall outer surface and an internal coolant source;

a film-cooling hole in the wall and extending from the internal coolant source to the wall outer surface, the film-cooling hole including:

a metering section in fluid communication with the internal coolant source;

a diffuser section in fluid communication with the metering section and including a first internal surface spaced from a second internal surface and including a coating collector, the diffuser section having a larger cross-sectional area than the metering section; and a hood section including a member extending outwardly from the wall outer surface, the member including a hood outer surface parallel to the wall outer surface and a hood back surface connecting the hood outer surface and the wall outer surface; and a coating on the wall outer surface, on the hood back surface, and in the coating collector, wherein the hood outer surface extends through the coating.

15. The turbomachine component of claim 14, wherein the coating collector includes a portion of a second internal surface of the diffuser section spaced from the first internal surface, the portion of the second internal surface having a first end intersecting the wall outer surface and forming a downstream edge of the film-cooling hole and a second end that transitions to one the metering section and another portion of the second internal surface.

16. The turbomachine component of claim 14, wherein the member of the hood section further includes a hood internal surface contiguous with the first internal surface of the diffuser section, and the hood internal surface intersects the hood outer surface forming an upstream edge of the film-cooling hole, and wherein the metering section intersects the coating collector at an internal edge, wherein the upstream edge is over the internal edge.

17. The turbomachine component of claim 14, wherein a distance between the hood outer surface and the wall outer surface is less than or equal to a thickness of the coating.

18. The turbomachine component of claim 14, wherein a depth of the coating collector is greater than or equal to a thickness of the coating.

19. The turbomachine component of claim 14, wherein the hood section further includes side walls coupling opposing sides of the member to the wall outer surface.

20. The turbomachine component of claim 14, wherein the member of the hood section extends from the wall outer surface at an obtuse angle greater than 120° and less than 180°.

* * * * *